(12) United States Patent
Sun et al.

(10) Patent No.: US 9,989,213 B2
(45) Date of Patent: Jun. 5, 2018

(54) LIGHTING DEVICE WITH OPTICAL REFLECTOR, LUMINAIRE HAVING SUCH LIGHTING DEVICE AND METHOD OF MANUFACTURING A COMPACT OPTICAL REFLECTOR

(71) Applicant: KONINKLIJKE PHILIPS N.V., Eindhoven (NL)

(72) Inventors: Li Wei Sun, Shanghai (CN); Yun Li, Shanghai (CN); Yanmeng Sun, Shanghai (CN); Qing Guo, Shanghai (CN)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 590 days.

(21) Appl. No.: 14/405,180

(22) PCT Filed: Jun. 3, 2013

(86) PCT No.: PCT/IB2013/054555
§ 371 (c)(1),
(2) Date: Dec. 3, 2014

(87) PCT Pub. No.: WO2013/182966
PCT Pub. Date: Dec. 12, 2013

(65) Prior Publication Data
US 2015/0146429 A1    May 28, 2015

(30) Foreign Application Priority Data

Jun. 4, 2012 (WO) .............. PCT/CN2012/076421

(51) Int. Cl.
*F21V 19/02* (2006.01)
*F21V 7/09* (2006.01)
(Continued)

(52) U.S. Cl.
CPC ............ *F21V 7/09* (2013.01); *B29D 11/0074* (2013.01); *F21V 7/0066* (2013.01); *F21V 7/041* (2013.01);
(Continued)

(58) Field of Classification Search
CPC . B29D 11/0074; B29K 2995/003; F21K 9/68; F21V 14/02; F21V 19/02;
(Continued)

(56) References Cited

U.S. PATENT DOCUMENTS 4,395,750 A * 7/1983 Scheidemann ....... F21V 7/0008
362/239
6,264,347 B1 7/2001 Godbillon et al.
(Continued)

FOREIGN PATENT DOCUMENTS

CN    100465504 C    3/2009
CN    201836718 U    5/2011
(Continued)

*Primary Examiner* — Tsion Tumebo

(57) ABSTRACT

The invention relates to a lighting device comprising: an optical reflector (200, 500) which has an interior surface (201); and a light source (205, 505); wherein the interior surface has a plurality of facets (203) that form a Fresnel structure-like reflecting surface (202), and the interior surface may further have a cone (504) so as to avoid light from the light source being reflected back to the light source; wherein at least part of the light from the light resource is reflected by the optical reflector into an output direction. The invention also relates to a luminaire which comprises the lighting device according to the invention. The invention further relates to a method of manufacturing an optical reflector for a spot lighting lamp. The method comprises forming (S01) a bowl-like structure that has an opening for emitting light and that has a Fresnel structure on the interior surface of the bowl-like structure.

9 Claims, 5 Drawing Sheets

(51) Int. Cl.
*F21V 7/04* (2006.01)
*F21V 7/06* (2006.01)
*F21V 7/10* (2006.01)
*F21V 14/02* (2006.01)
*B29D 11/00* (2006.01)
*F21V 7/00* (2006.01)
*F21V 7/22* (2018.01)
*F21Y 115/10* (2016.01)
*F21K 9/68* (2016.01)

(52) U.S. Cl.
CPC ............ *F21V 7/048* (2013.01); *F21V 7/06* (2013.01); *F21V 7/10* (2013.01); *F21V 14/02* (2013.01); *F21V 19/02* (2013.01); *B29K 2995/003* (2013.01); *F21K 9/68* (2016.08); *F21V 7/0008* (2013.01); *F21V 7/22* (2013.01); *F21Y 2115/10* (2016.08)

(58) Field of Classification Search
CPC ...... F21V 7/0008; F21V 7/0066; F21V 7/041; F21V 7/048; F21V 7/06; F21V 7/09; F21V 7/10; F21V 7/22; F21Y 2115/10
USPC .................. 362/235, 285, 304; 264/1.1
See application file for complete search history.

(56) References Cited

U.S. PATENT DOCUMENTS

| | | | |
|---|---|---|---|
| 6,648,490 B2* | 11/2003 | Klose | F21S 8/022 362/232 |
| 6,851,835 B2 | 2/2005 | Smith et al. | |
| 6,964,490 B2* | 11/2005 | Scholz | F21V 21/403 362/285 |
| 7,131,760 B2 | 11/2006 | Mayer et al. | |
| 7,270,448 B1* | 9/2007 | Maley, Sr. | B61L 15/02 362/333 |
| 7,850,345 B2 | 12/2010 | Holder et al. | |
| 2002/0136025 A1* | 9/2002 | Zhang | F21S 48/215 362/555 |
| 2005/0007768 A1* | 1/2005 | Holder | F21L 4/027 362/157 |
| 2005/0270781 A1 | 12/2005 | Marks | |
| 2006/0032447 A1* | 2/2006 | Liu | C23C 16/274 118/725 |
| 2007/0189017 A1* | 8/2007 | Hofmann | F21S 48/328 362/345 |
| 2008/0074885 A1* | 3/2008 | Brands | F21K 9/23 362/296.07 |
| 2009/0290349 A1* | 11/2009 | Chu | F21S 48/328 362/249.02 |
| 2010/0254115 A1* | 10/2010 | Wegh | F21S 10/02 362/84 |
| 2010/0290222 A1 | 11/2010 | Pickard et al. | |

FOREIGN PATENT DOCUMENTS

| | | |
|---|---|---|
| EP | 1221725 A1 | 7/2002 |
| EP | 2103869 A1 | 9/2009 |
| EP | 2369224 A1 | 9/2011 |
| WO | 2010144572 A2 | 12/2010 |
| WO | 2011074424 A1 | 6/2011 |

* cited by examiner

LIGHTING DEVICE WITH OPTICAL REFLECTOR, LUMINAIRE HAVING SUCH LIGHTING DEVICE AND METHOD OF MANUFACTURING A COMPACT OPTICAL REFLECTOR

CROSS-REFERENCE TO PRIOR APPLICATIONS

This application is the U.S. National Phase application under 35 U.S.C. § 371 of International Application No. PCT/IB13/054555, filed on Jun. 3, 2013, which claims the benefit of International Application No. PCT/CN2012/076421, filed on Jun. 4, 2012. These applications are hereby incorporated by reference herein.

FIELD OF THE INVENTION

The present invention relates to an illumination appliance, particularly to a spot lighting device, and more particularly to a spot lighting lamp with an optical reflector, and it also relates to a method of manufacturing such an optical reflector.

BACKGROUND OF THE INVENTION

Generally, an optical reflector is one of the most useful optics of a lamp for spot lighting. However, a conventional reflector of a spotlight with a light source 105 often is large in size, particularly the depth thereof is too large. As shown in FIG. 1, the optical reflector 100 takes up almost over 80% of the volume of the whole lamp.

In particular, an LED spot lighting lamp needs much more space than a halogen lamp, or an incandescent lamp, etc., for its driving circuit, heat sink, and so on. Thus, for example, an LED spotlight can hardly be used in a conventional spot lighting lamp having such a conventional optical reflector. In other words, the conventional optical reflector can hardly be used in a lamp having a lighting element such as an LED, due to its large height and size. In addition to a smaller size, a better anti-glare performance is always desired for a spot lighting lamp, and an appropriate spotlight profile during operation is also preferred.

SUMMARY OF THE INVENTION

In respect of the disadvantages of the prior art, the present invention can provide a more compact and efficient lighting device with an optical reflector, a luminaire having such a lighting device and a method of manufacturing such an optical reflector.

The present invention is based on the insight that a Fresnel structure-like (or equivalences thereof) reflecting surface can be used in an optical reflector to effectively reduce the size of the reflector.

According to one aspect, the present invention relates to a lighting device, such as a lighting device for spot lighting, comprising: an optical reflector which has an interior surface; and a light source; wherein the interior surface has a plurality of facets that form a Fresnel structure-like reflecting surface, and preferably, the interior surface further has a cone so as to avoid light from the light source being reflected back to the light source; wherein at least part of the light from the light source is reflected by the optical reflector into an output direction. Thus, in the invention, the implementation of the Fresnel structure in the reflector for a spotlight greatly reduces the depth and size of the reflector and hence of the lamp, and enables LED to be used in the spot lighting lamp, thereby saving space for the driving circuit and heat sinks of the lighting element such as an LED.

In an exemplary embodiment of the lighting device according to the invention, a plurality of facets is in the form of annular, stepped facets, and each of the facets is individually arranged with respect to at least one parameter, so as to redistribute part of the light emitted from the light source, wherein the at least one parameter for a facet comprises at least one of its position, slope, or size. Alternatively, in an embodiment, the plurality of facets is shaped to form a reflecting paraboloid and the light source is substantially positioned at a focus of the paraboloid, such that the light from the light source can be collimated as parallel light after being reflected.

In an embodiment of the lighting device according to the invention, the light source is movable with respect to the optical reflector along an axis direction of the optical reflector or along the plane perpendicular to the axis direction. Especially, in an embodiment, the lighting device further has a holder for supporting the light source with respect to the reflector; wherein the holder is fixed with respect to the reflector while the light source is movable on the holder, or the holder is movable with respect to the reflector while the light source is fixed on the holder. Especially, the holder has electrical connections for coupling the light source to a power supply. Thereby, the relative movement of the light source with respect to the optical reflector can effectively change the direction or profile of the output beam.

In another embodiment of the lighting device according to the invention, the cone is shaped in such a manner that the light, emitted from the light source and projected on the cone, is reflected to the plurality of facets, and then reflected into the output direction, preferably, as collimated light.

According to another aspect, the present invention relates to a luminaire comprising the above mentioned lighting device; and a power supply or a mains power input end.

According to another aspect, the present invention relates to a method of manufacturing an optical reflector for a spot lighting device. The method comprises: forming a bowl-like structure that has an opening for light emission and that has a Fresnel structure-like surface on its interior surface.

In an embodiment of the method according to the invention, the method further comprises a step of: forming reflective material or affixing a reflective layer on the interior surface of the bowl-like structure. In another embodiment, the step of forming a bowl-like structure further comprises: forming a cone on the interior surface, arranged to avoid that light is reflected back to the light source.

According to the invention, at least some advantages would be achieved since the structure of the optical reflector and hence of the lamp apparatus will be more compact and effective, and the manufacture of such an optical reflector may be performed effectively.

These and other aspects of the invention will be apparent from and elucidated with reference to the embodiment (s) described hereinafter.

BRIEF DESCRIPTION OF THE DRAWINGS

Embodiments of the invention will now be described, by way of example only, with reference to the accompanying schematic drawings in which corresponding reference symbols indicate corresponding parts, and in which.

Figure 1:
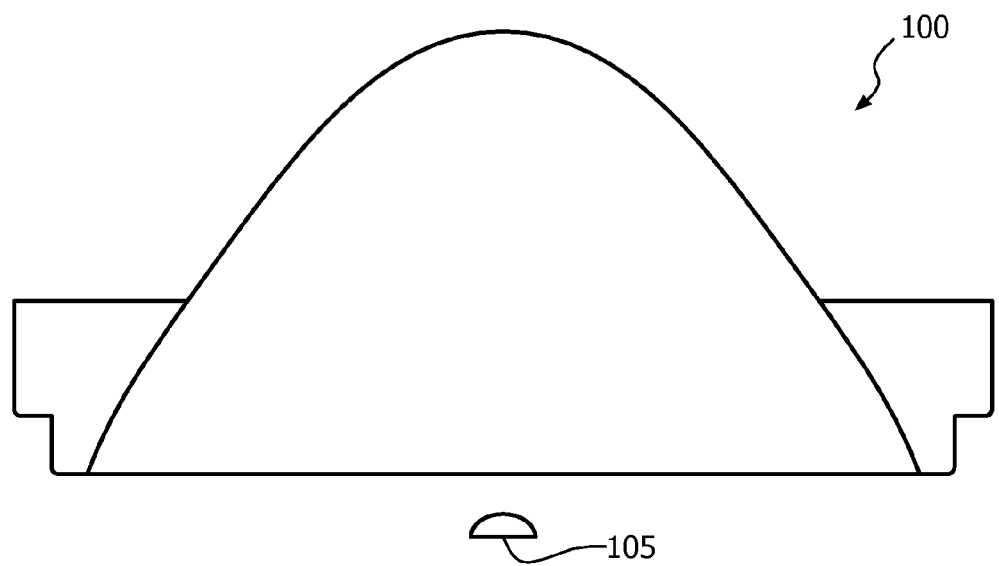
FIG. 1 schematically illustrates a cross-sectional view of a conventional optical reflector for a spot lighting lamp.

In the drawings, similar signs usually refer to similar elements or parts of the structures, unless indicated otherwise. For the sake of clarity of the drawings and the description, not all similar elements or parts are indicated in the figures by reference numerals, although they can be present in structures shown in other figures.

DETAILED DESCRIPTION OF THE EMBODIMENTS

Figure 2:
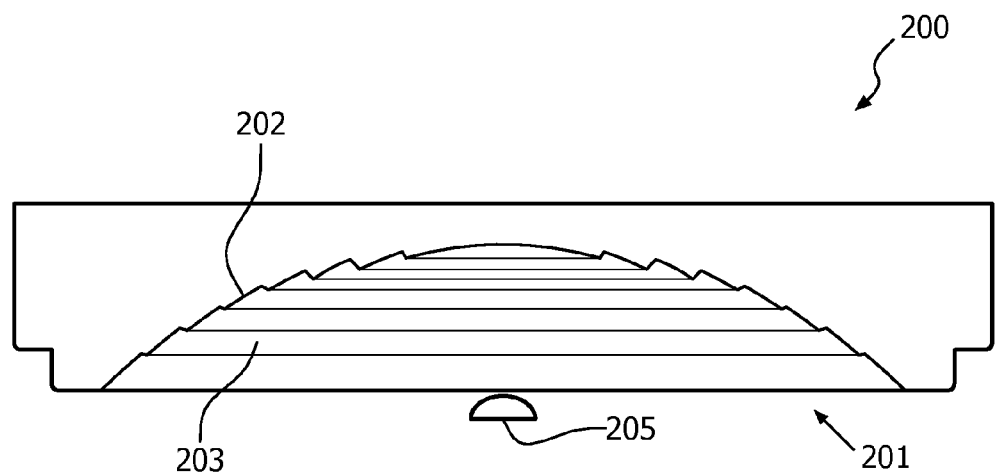
FIG. 2 illustrates a cross-sectional view of an optical reflector having a Fresnel structure-like reflecting surface according to an embodiment of the invention.

FIG. 2 schematically illustrates a cross-sectional view of an optical reflector 200 having, for example, a bowl-like shape according to an embodiment of the invention, wherein it comprises a Fresnel structure-like reflecting surface 202 on its interior surface 201. Particularly, the Fresnel structure-like reflecting surface 202 is arranged to reflect the light from a light source 205 such that the light impinges on the interior surface of the optical reflector.

A Fresnel lens structure lens is widely used in the optics field. Generally speaking, a Fresnel lens is derived from a conventional lens, where portions of the lens are removed and said portions are chosen in a way such that the removal of said portions introduces a change of the optical path in a radiation beam passing through the Fresnel lens, wherein the change is a multiple of the half-wavelength of said radiation beam. A Fresnel lens is usually designed for a particular wavelength. However, the inventor has surprisingly found that the Fresnel structure-like (or equivalent) reflector can be used to replace the ordinary reflector and can effectively reduce the thickness of the optical reflector (depth of the curved surface) by causing the light to be reflected on the indented surface.

Furthermore, as can be seen from FIG. 2, with respect to the Fresnel structure-like reflecting surface 202, said reflecting surface consists of a plurality of facets 203 having different stepped sides, wherein actually each of them can be calculated and optimized to achieve the desired beam patterns with different beam angles. Every single facet 203 of Fresnel structure-like reflecting surface 202 of the optical reflector 200 can individually redistribute part of the light from a light source. This means that a design style with a high degree of freedom can be obtained with several parameters for optimization of the optical reflector.

Furthermore, as shown in FIG. 2, the optical reflector 200 with a Fresnel structure-like reflecting surface 202 in its interior surface has a greatly reduced depth and takes up much less space, thereby saving substantial space for the driving circuit and heat sink elements, such as those used in an LED lamp.

Figure 3:
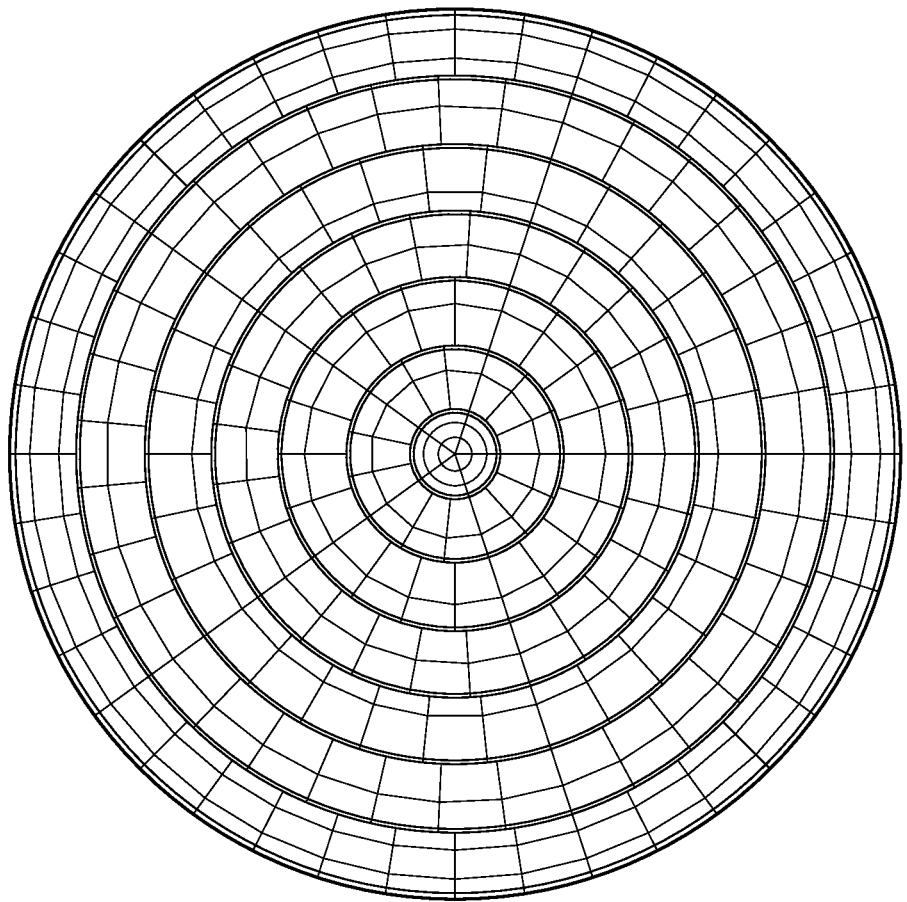
FIGS. 3 and 4 schematically illustrate an optical reflector having a Fresnel structure-like reflecting surface according to an embodiment of the invention, in which Fresnel structure-like reflecting surface at least part of the annular Fresnel lamellae comprise separate sub-facets.
Figure 4:
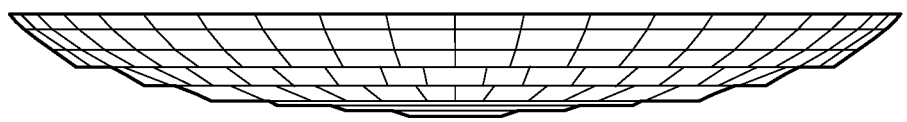

Based on the features as mentioned above, the optical reflector according to the invention can be implemented to obtain substantial advantages with respect to the prior art; some additional features can be implemented to obtain more advantages, which will be illustrated hereinafter by means of some exemplary embodiments of the invention, with reference to the relevant figures. For instance, at least part of the Fresnel structure-like reflecting surface of the optical reflector according to the invention may be formed so as to have separate sub-facets on every single annular Fresnel lamella, as is exemplarily illustrated in FIGS. 3 and 4. Such an arrangement can help to achieve better beam uniformity performance and better color mixing on the target illumination surface, due to the fact that the separate sub-facets form a specular reflecting surface. Thus, a larger number of sub-facets results in a better contribution to uniform illumination on the target area.

Figure 5:
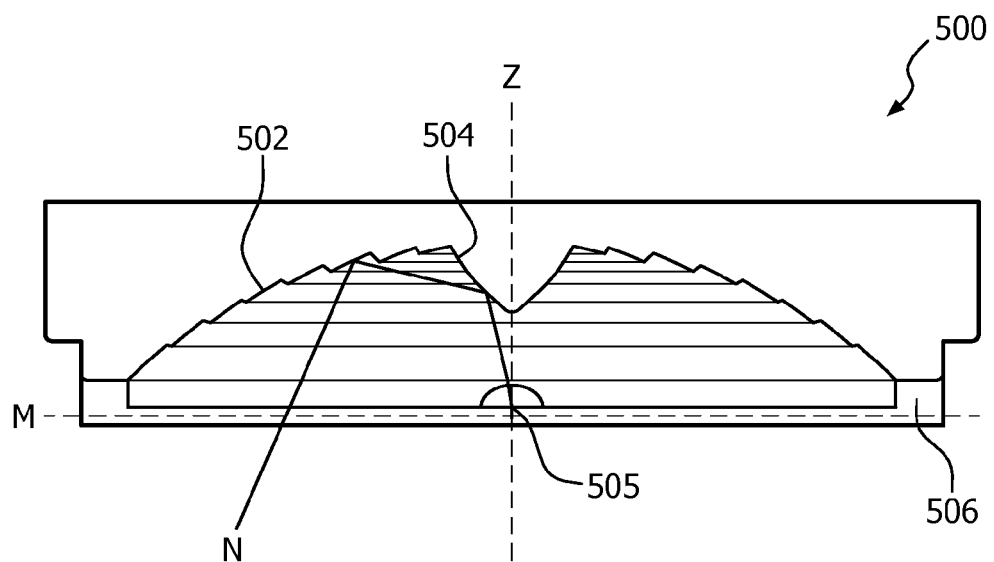
FIG. 5 schematically illustrates a cross-sectional view of a lighting device according to an embodiment of the invention.
Figure 6:
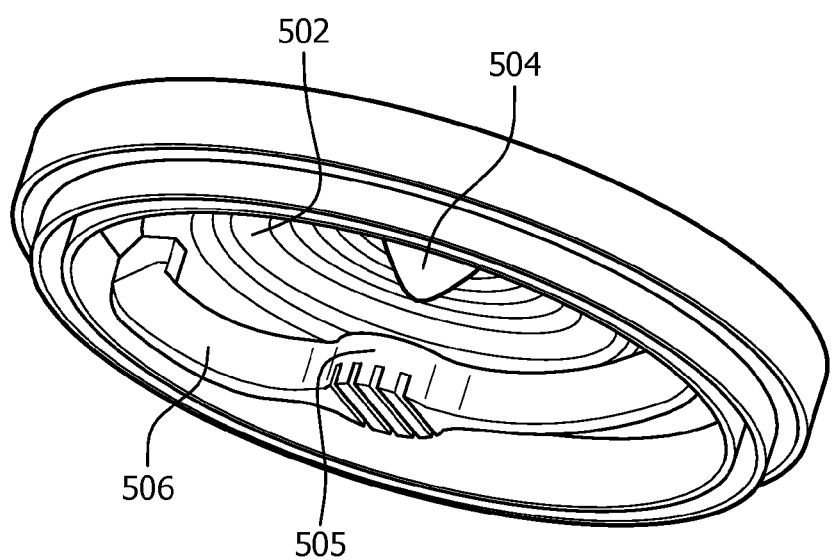
FIG. 6 schematically illustrates a stereogram of the lighting device in FIG. 5.

FIG. 5 schematically illustrates a cross-sectional view of a lighting device according to another embodiment of the invention; FIG. 6 schematically illustrates a stereogram of the lighting device in FIG. 5. As shown in FIGS. 5 and 6, within the interior surface of the optical reflector 500, a cone 504 is formed, for example, in the center of the interior surface (i.e., in the center of the Fresnel structure-like reflecting surface), with an optimized tapering end in the direction of light output. The cone 504 is arranged to avoid light from the source being reflected back to the light source, which thus can improve the efficiency of the optical reflector and prevent the light source, such as LED, from ageing quickly. Otherwise, the light emitted from the light source 505 may be reflected back to the light source, which is also disadvantageous in terms of efficiency and optical performance of the lighting device.

In addition, the cone 504 can be appropriately dimensioned so as to merely avoid the light being reflected back to the light source 505, without substantially reducing the area of the reflective interior surface. For instance, the cone 504 is shaped in such a manner that light emitted from the light source 505 and projected on the cone 504 is reflected to the plurality of facets, and then reflected into the output direction, preferably as collimated light. Apparently, those skilled in the art may adapt the designs according to particular requirements.

The light path of the light from the light source and impinging on the optical reflector can be schematically illustrated by FIG. 5, wherein the light is reflected at the Fresnel structure-like reflecting surface into the output direction. Those skilled in the art can understand that the cone 504 can be shaped to reflect the light from the light source 505 to the surrounding annular lamellae of the Fresnel structure-like reflecting surfaces, and then into the output direction, bypassing the light source.

According to another aspect of the invention, a lamp for spot lighting comprises a compact optical reflector 500 having a Fresnel structure-like reflecting surface 502, and a light source 505, such as LED, HID lamp, and halogen lamp, and other appropriate elements. A lamp for spot lighting may comprises further elements such as a power supply, power input end, driving circuit, connecting wires, housing, heat sink element, coupling element, etc.

Generally speaking, the lamp comprising an optical reflector according to the invention, as shown in FIGS. 5 and 6, has a holder 506 for the optical reflector 500, for supporting a light source 505, such as an LED. The holder 506 is attached to the compact optical reflector 500. The holder 506 can be integral with the optical reflector 500 or separate from the optical reflector 500.

Figure 7:
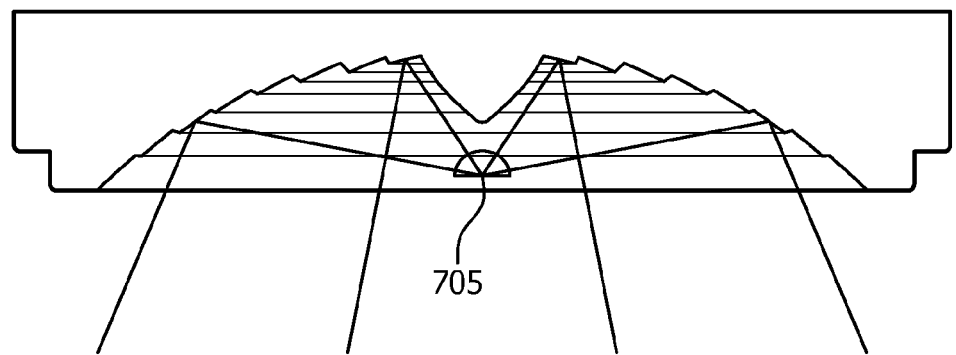
FIGS. 7, 8 and 9 schematically illustrate different positions of the light source with respect to the optical reflector, and the different beam profiles obtained, respectively.
Figure 8:
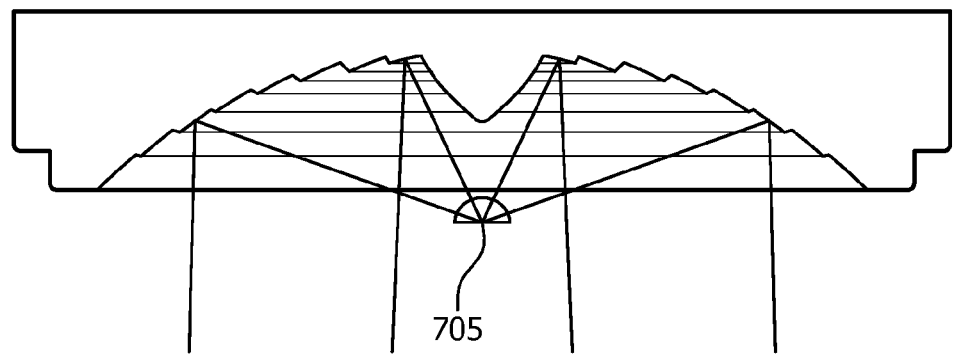
Figure 9:
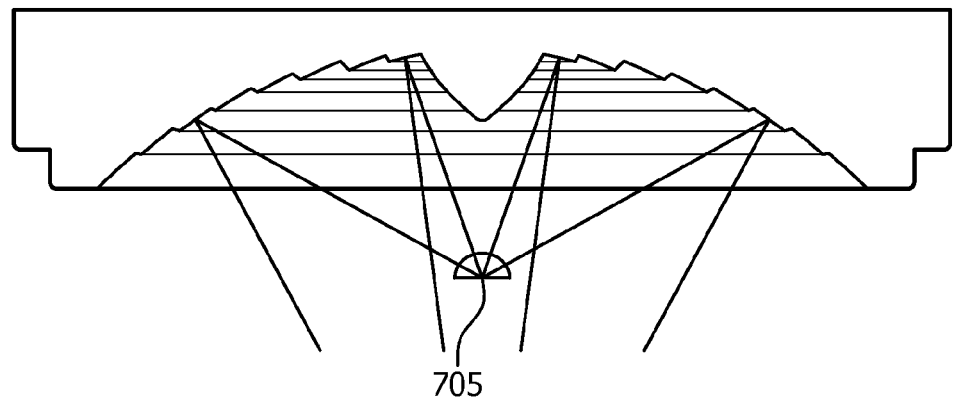

In particular, the holder 506 is arranged such that the light source 505 on the holder 506 can be movable with respect to the compact optical reflector 500 in the Z axis direction of optical reflector 500. That is, the distance between the light source 505 and the optical reflector 500 is adjustable. For instance, as shown in FIG. 7, the light source 705 can be situated in a deeper position, causing the light beam from the lamp 705 to be relatively dispersed. Alternatively, as shown in FIG. 8, the light source 705 can be situated in a mediate position, causing the light beam to be less dispersed, and more collimated. Alternatively, as shown in FIG. 9, the light source 705 can be situated in an outer position, causing the light beam to be still less dispersed and more converged.

Besides, the light source can also be movable with respect to the compact optical reflector 500 in a plane M perpendicular to the Z axis direction. With this design, the main direction of the light output of the lamp can be adjustable such that the light output can travel in a left, right, up or down direction, as is understood by those skilled in the art and not shown in the current drawings.

According to a further embodiment of the invention, at least part and preferably all of the light from the light source is reflected by the Fresnel structure-like reflecting surface, by having the light source emit light toward the reflecting surface, and thus a better anti-glare effect is obtained. This is due to the fact that less or preferably no light is directly emitted toward the angle range outside the main direction of a lamp, and that a decreasing light intensity in the angle range outside the main direction is obtained, because it seems to the human eye 1001 that the spot light source is transformed into a surface light source.

Figure 10:
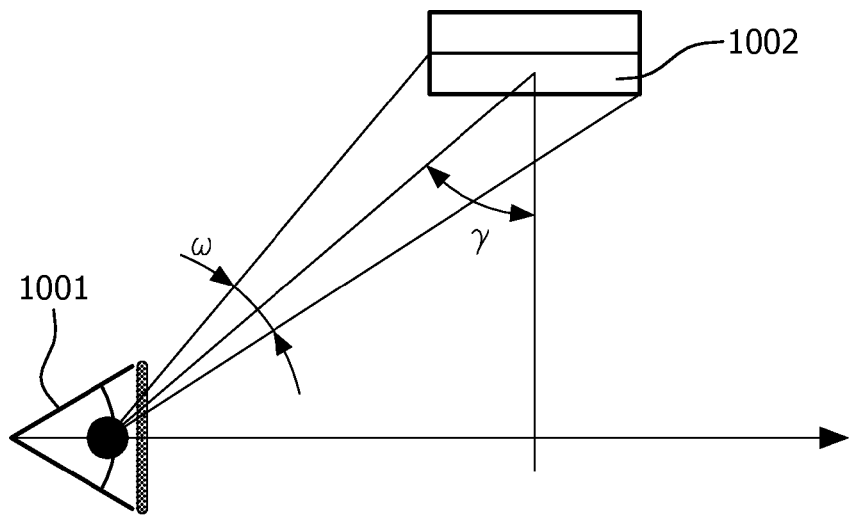
FIG. 10 schematically illustrates the definitions of variables of a UGR calculation.

The inventor has found that, the change of the distance between the light source and the reflecting surface of the optical reflector can lead to a change of the FWHM (full width at half maximum) beam angle of a spot lighting application at a certain range depending on the specific design. Generally, a parameter called UGR (unified glaring ratio) can also represent the glare effect of one specific lamp. The formula for UGR is:

$$UGR=8 \log[0.25/L_b * (\Sigma L^2 \omega/p^2)],$$

wherein, with reference to FIG. 10, $L_b$: is the background luminance;
L: is the luminance of the luminous part 1002;
ω: is the solid angle of the luminous part 1002;
p: is the Guth position index.

Generally, the bigger the value of the UGR, the worse the anti-glare performance of the lamp is. A Total Internal Reflection (TIR) collimator is a collimator with internal reflection surface(s) which reflect and collimate light by total internal reflection, such as a total internal reflection lens, etc. Given the same intensity distribution of one lamp, the reflector solution always has a lower L (luminance is proportional to the reciprocal of the source area) value than the TIR collimator, which means that the reflector solution has a better anti-glare performance. Normally, the area of the reflector solution is at least twice the area of the TIR collimator, which means that the performance of the reflector solution is at least twice better than that of the TIR collimator solution at the same intensity distribution. In addition, the UGR value is only calculated for the light intensity wider than the 25 D viewing angle γ, in which 25 D is the limited viewing angle from the vertical direction for the UGR calculation (UGR is only calculated from a viewing angle of 0 degrees to 25 degrees). For conventional reflectors, the intensity of a wide viewing angle is always strong, because a normal reflector has a limited redistribution capability. Nevertheless, the redistribution capability of this new reflector is close to that of a TIR collimator, which can redistribute all of the light emitted from the source, which indicates that the intensity at a wide viewing angle can be restrained to the required value, as is desired, and the UGR value can be much lower than that of normal reflectors. From the simulation shown in FIGS. 7-9, where an LED 705 is used as the light emitting element, it is observed that the ratio of the lights emitted to every single facet of the reflector can be freely distributed according to specific requirements. The beam pattern can be flexibly changed within a certain range by modifying the distance between LED and reflector. Furthermore, the generated beam pattern can be determined by the facet through its position, slope, size, etc.

Generally, according to the invention, the anti-glare effect of a lamp can be substantially improved by enabling more or all light to be reflected by the reflector before being directed into the output direction. That is, there is no or only a small amount of light that is directly output from the light source. Thus, a spot lighting lamp comprising this compact reflector can be achieved having a better anti-glare effect than that of the prior art.

Figure 11:
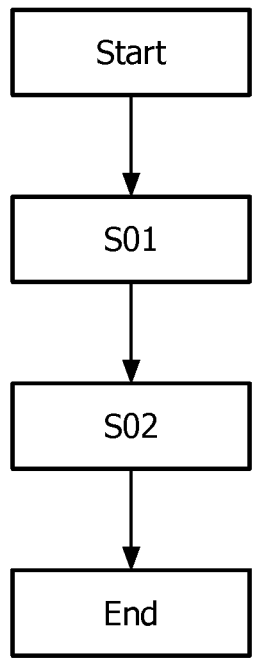
FIG. 11 schematically illustrates the steps of a method of manufacturing an optical reflector according to an embodiment of the invention.

According to a further aspect of the invention, the compact optical reflector can be manufactured in a manner as shown in FIG. 11:

In step S01, the main body of the optical reflector is built by molding or injecting or other appropriate processes, using plastic materials (or other appropriate materials). Particularly, a bowl-like reflector structure is formed that has an opening for outputting a light beam and that is provided with a Fresnel structure-like surface on the interior surface of the bowl-like structure, wherein the Fresnel structure-like surface is visible from the opening of the bowl-like structure.

In addition, a cone in the center of the interior surface is formed during the step S01, to avoid light being reflected onto the light source.

In step S02, some reflective material or surface can be formed on the interior surface of the bowl-like structure, especially on the Fresnel structure-like surface. For instance, the reflective material can be a coating. Or the reflective material can be a reflective layer affixed on the interior surface of the reflector. Or otherwise, the basic material of the reflector may have reflective properties which can fulfill the performance requirement for building this kind of compact reflector. Thus, applying a coating or affixing a layer on the interior surface can be feasible.

Alternatively, the reflective material may be the same as that of the body of the reflector, and is a reflective metal material, allowing the above step S02 to be omitted after step S01. But there may be a further step of smoothening the reflective surface, as is understandable to those skilled in the art.

It should be noted that the above-mentioned embodiments illustrate rather than limit the invention, and that those skilled in the art will be able to design many alternative embodiments without departing from the scope of the appended claims. In the claims, use of the verb "to comprise" and its conjugations does not exclude the presence of other elements or steps, and the article "a", or "an" preceding an element does not exclude the presence of a plurality of such elements. The mere fact that certain measures are recited in mutually different dependent claims does not indicate that a combination of these measures cannot be used to advantage. Any reference signs in the claims should not be construed as limiting the scope.

The invention claimed is:

1. A lighting device, comprising:
an optical reflector which has an interior surface; and
a light source;
a holder configured to support the light source, wherein the holder comprises a plurality of support legs, each support leg being attached to the optical reflector at a point outside the interior surface;
wherein the interior surface comprises a plurality of facets that form a Fresnel structure-like reflecting surface and the plurality of facets is shaped to form a reflecting paraboloid;
wherein at least part of the light from the light source is reflected by the optical reflector into an output direction, wherein the interior surface further comprises a cone which is formed in the center of the interior surface, with a tapering end in the output direction, and the cone is dimensioned to avoid light from the light source being reflected back to the light source, without substantially reducing the area of the Fresnel structure-like reflecting surface; and
wherein the holder is fixed with respect to the optical reflector while the light source is movable on the holder such that the light source is movable within a plane perpendicular to an axis direction of the optical reflector, or wherein the holder is movable with respect to the optical reflector while the light source is fixed on the holder such that the light source is movable within a plane perpendicular to an axis direction of the optical reflector.

2. The lighting device according to claim 1, wherein each of the facets is individually arranged with respect to at least one parameter, so as to redistribute part of the light emitted from the light source, and wherein the at least one parameter for a facet comprises at least one of its position, slope and size.

3. The lighting device according to claim 1, wherein the light source is substantially positioned at a focus of the paraboloid, such that the light from the light source is collimated into parallel light after being reflected.

4. The lighting device according to claim 1, wherein the plurality of facets is in the form of annular, stepped facets.

5. The lighting device according to claim 1, wherein the holder has electrical connections for connecting the light source and a power supply.

6. The lighting device according to claim 1, wherein the light source is one of an LED, an HID lamp, and a halogen lamp.

7. A luminaire comprising:
the lighting device according to claim 6; and a power supply or a mains power input end.

8. A method of manufacturing an optical reflector for a spot lighting device, the method comprising the step of:
forming a bowl-like structure that has an opening for the emission of light and that has a Fresnel structure-like surface on the interior surface of the bowl-like structure for reflecting the light;
forming a cone on and in the center of the interior surface, and the cone is dimensioned to avoid the light being reflected back to a light source of the spot lighting device, without substantially reducing the area of the Fresnel structure-like reflecting surface; and
coupling a holder for the light source to the optical reflector at a point outside the interior surface via a plurality of support legs of the holder, wherein the holder is fixed with respect to the optical reflector while the light source is movable on the holder such that the light source is movable within a plane perpendicular to an axis direction of the optical reflector, or wherein the holder is movable with respect to the optical reflector while the light source is fixed on the holder such that the light source is movable within a plane perpendicular to an axis direction of the optical reflector.

9. The method according to claim 8, wherein the method further comprises a step of:
forming reflective material or affixing a reflective layer on the interior surface of the bowl-like structure.

* * * * *